Patented Nov. 19, 1940

2,222,330

UNITED STATES PATENT OFFICE 2,222,330

PROCESS OF SALT PURIFICATION

Arthur J. Weinig, Golden, Colo., assignor to Potash Company of America, Denver, Colo., a corporation of Colorado No Drawing. Application June 25, 1937, Serial No. 150,341

5 Claims. (Cl. 209—166)

This invention relates to a method of separating gangue matter from the valuable constituents of sylvinite ore and the like.

It is a primary object of the present invention to provide a simple, efficient and economical process in which gangue matter may be effectively separated from associated sodium chloride, or potassium chloride, or both, and removed as an impurity from the treatment.

It has been found that potassium chloride and sodium chloride constituents of sylvinite ores may be separated effectively by froth flotation, and in my copending applications, Serial Nos. 38,319, and 81,729, I have disclosed treatments of this character. In these applications, gangue is floated with one chloride in a treatment involving the separation of such chloride from the other chloride in the pulp.

The present process is designed to have application in conjunction with, or independently of treatments of the type disclosed in the aforesaid applications.

Thus, where potassium chloride is to be recovered as a froth concentrate, I have discovered that the flotation separation can be improved by first separating gangue constituents from a pulp in which the valuable constituents of sylvinite ore are suspended, and thereafter floating off the potassium chloride in a substantially pure condition for its separation from the sodium chloride content. Similarly, a reversal of these operations will be effective also. In the flotation of sylvite, reagents of the type disclosed in application No. 38,319 are used, namely an alkali salt of a sulfated alcohol, or an alkali salt of a sulfated aliphatic alcohol, having from 5 to 14 carbon atoms in the molecule, such as sodium lauryl sulfate or sodium octyl sulfate for example.

Under certain conditions, it may be desirable to make a market product of the sodium chloride reject of an operation of the type disclosed in application No. 81,729, in which potassium chloride constituents of sylvinite ore are purified while a sodium chloride and gangue mixture separated therefrom is produced as a waste product. The present process is effective for this purpose, the gangue matter contained in the reject product being readily floated off from the previously associated sodium chloride content, with the result that the sodium chloride constitutes a substantially pure residue of the operation.

It will be apparent to those skilled in the art that the process may be utilized further in purifying natural salt by froth flotation, and the process also has application in cleaning and purifying sodium and potassium salts, such as sodium chloride and potassium chloride artificially produced or recrystallized in industrial operations, where such compositions have impurities of the type described herein as being amenable to the present treatment.

The present invention relates to the use of certain reagents by which certain compositions are selectively floated for their separation from halides with which they have been associated in their natural or artificial formation.

The separation of the present invention involves the use of a pulp formed by suspending the valuable constituents under treatment in a saturated solution thereof, and then subjecting such pulp to the action of a flotation reagent, which in the presence of agitation and aeration selectively carries the gangue matter to the surface as a froth to be subsequently removed as a reject product, while the valuable constituents are collected and recovered as a non-floated residue of the treatment.

Many compositions classed as insoluble gangues may be floated by the present process, and in particular, such gangue constituents of sylvinite ores and the like, as clays, gypsum, anhydrite, iron oxide, manganese oxide, polyhalite, langbeinite, leonite and glaserite, are acted on by the reagent and carried to the surface in a froth.

Numerous reagents and reagent combinations may be utilized in the present process. For example, such compositions as oleic acid (red oil), coconut oil soaps, palm kernel oil soaps, resin soaps, cresylic acid and phenol oils, or mixtures thereof are effective for this purpose.

The amount of reagent used in the treatment will be determined by the properties of the particular pulp treated, and a rather close control is advisable to attain best results. Generally, a range of from $\frac{1}{10}$ to 10 lbs. reagent per ton of ore treated will give good results.

The reagent selected must act both as a frother and collector. Most of the aforementioned reagent compositions act both as frothers and collectors, and in any given operation, if greater selectivity is required than is afforded by a soap or fatty acid, or mixture thereof, a modifier such as cresylic acid may be used effectively in small quantities, to improve collection.

The advantages of cresylic acid in a flotation operation of this character have been described in my co-pending application Serial No. 123,484, and reside primarily in improving selectivity while reducing operating cost and increasing plant capacity. In the present process, cresylic acid may be used as a collector or as a modifier for another frother and collector reagent composition, and it will be understood that where cresylic acid acts as a modifier, relatively small amounts thereof will suffice to produce the desired result.

In preparing the pulp of the treatment, the sylvinite ore, or other similar gangue-containing material, is reduced to a suitable degree of fineness in any convenient manner, and is then introduced into a saturated solution of the same material. While the fineness of the grind will differ with different substances and treatment problems, a 48-mesh product may be taken as a standard.

The pulp is introduced into a suitable froth flotation cell and subjected to agitation and aeration in the presence of one of the above-mentioned reagents, or combinations of reagent, and the process is continued until the separation is substantially complete. The duration of the treatment will vary, but as a general rule, 10 to 15 minutes is sufficient time to complete the separation.

The amount of the reagent used in the treatment also will vary and the range of from $\frac{1}{10}$ to 10 lbs. of reagent per ton of ore will produce best results. It will be understood that the efficiency of the operation is in part determined by reagent cost, and small additions of cresylic acid to oleic acid or soaps, used as the reagent will reduce the quantity of the latter required for good selectivity, and thereby reduce operating costs.

The temperature control features of the type disclosed and claimed in my Patent No. 2,105,294 of January 11, 1938, may be employed effectively in the present process. Advantage is taken of the different solubility characteristics of sodium chloride and potassium chloride to effect a separation by causing one or the other to go into solution in connection with certain flotation separations.

To afford a better understanding of the scope and effectiveness of the present process, reference will be made to certain illustrative operations, in which various applications of the process to different treatment problems are cited.

In the first of these, potassium chloride is dissolved when sodium chloride containing it is treated in a saturated sodium chloride solution. The salt of the treatment was analyzed as follows: 1.5% insolubles (gangues), 13.9% KCl and 84.5% NaCl.

The pulp was prepared by introducing 800 grams of this ore into 2000 c. c. of a saturated NaCl solution containing no KCl. One quarter pound of coconut oil soap per ton of solid salt was employed as the reagent of the treatment. The products of this test analyzed as follows:

|  | Weight grams | Percent weight | Percent KCl | Percent NaCl | Percent Insol. |
|---|---|---|---|---|---|
| Froth concentrate | 38 | 4.7 | 2.1 | N. D. | 24.7 |
| Flotation tailing | 760 | 95.2 | 0.0 | 99.6 | 0.3 |

Subsequent analysis of the product tabulated as 2.1% KCl disclosed the same to be polyhalite present in the ore, and not KCl. This finding is consistent with other operations in which the reagents have been found to have no affinity for KCl.

It will be noted that while the total weight of products recovered checks the original weight taken very well, there is a great shortage of KCl in the products. The solution was analyzed for KCl and it was found to contain 52.9 grams KCl per litre or for the two litres of solution used, 105.8 grams of KCl dissolved. Thus where the solution of the pulp is not saturated with respect to KCl, any KCl contained as an impurity of NaCl may be separated therefrom automatically in an operation of this type.

A repetition of the operation in which the solution of the pulp was saturated with respect to both sodium chloride and potassium chloride gave the following product analysis:

|  | Percent weight | Percent KCl | Percent Insol. |
|---|---|---|---|
| Froth concentrate | 6.5 | 2.8 | 13.3 |
| Flotation tailing | 93.5 | 6.0 | 0.43 |

This test indicates that the solution must be kept unsaturated with respect to KCl if KCl is to be completely separated from the salt product. The final solution analyzed 135.5 grams KCl per litre which is the saturation point for KCl for the temperature existing and in the presence of excess NaCl.

From the foregoing it is apparent that if impure salt is subjected to flotation, the gangues float easily and are thereby separated from the salt. When potassium chloride is an impurity of the salt, it dissolves and replaces salt in the solution. The proper control requires that the solution be maintained unsaturated with respect to KCl during the flotation operation.

In order to render this operation workable, a certain temperature (ordinarily 70° F.) must be maintained to establish a saturation point for KCl. Having this, a quantity of solution nearly saturated with KCl must be removed from the circuit and cooled to cause KCl to crystallize out of solution. After separation of the crystallized potassium chloride, the solution is heated and returned to the flotation circuit, or the flotation circuit is maintained at a higher temperature than the separated solution returned thereto, and in either instance this returned solution again dissolves potassium chloride and the cycle is repeated.

From the foregoing, it will be apparent that when KCl containing gangue and some NaCl as an impurity is to be treated by the present process, the solution of the pulp should be saturated with respect to KCl and not saturated with respect to NaCl.

The reagents have no affinity for KCl and none for NaCl, so long as there is no lead or bismuth in the solution, and carry up the gangues in the froth while the NaCl is dissolved in the solution. In this operation a controlled temperature is also required.

Where the treated material consists of a single halide and gangue only and not of a more complex composition, the cleaning may be effected by reagent control alone. Thus the final reject NaCl and gangue product of an operation for separating potassium chloride from sylvinite ores for example, may be effectively refined by introducing the product into a saturated solution of the same material and subjecting the resulting pulp to a froth flotation treatment in the presence of a reagent comprising .07 pound coconut oil soap and .10 pound oleic acid (red oil) per ton of sodium chloride solids in the pulp.

The residue of this operation is substantially pure NaCl of good market grade.

A third operation will illustrate the wide application of the present invention to different materials. Prior to the flotation operation in which potassium chloride constituents are separated as a froth concentrate by the action of the aforesaid sulfonated alcohol reagents, and after classification, the pulp may be entered into a flotation machine and subjected to agitation and aeration in the presence of a reagent such as oleic acid, or palm kernel oil soap in an amount preferably not exceeding 1 lb. per ton of ore treated, which causes the gangue constituents and potash minerals other than KCl to rise and collect in the froth.

The cleaned pulp is then subjected to the flotation action in which a sulfated alcohol reagent is employed. The froth product of this secondary flotation is KCl solids substantially free from impurities.

The use of the foregoing treatment permits a closer reagent control to attain maximum selectivity in the secondary operation, and any gangue not removed in the first operation which is carried into the froth of the secondary operation will be of such insignificant quantity that it will not appreciably reduce the grade of the concentrate.

The foregoing examples demonstrate the wide application of the present process commercially. It may be used in connection with a separation of the valuable constituents of sylvinite ore, either at the beginning of the treatment to remove gangues before the halides are separated, or as a treatment subsequent to such separation to refine an impure concentrate of the separation.

While the purification of NaCl may be carried out in an operation of the above stated character, it is obvious that the process may be used to great advantage in the purification of salt obtained from natural formations, in which gangues are present as an impurity.

By combining solubility and reagent control, the concentrate of the process may be obtained in a high degree of purity to satisfy market standards. In addition the individual particles are surface coated by the fatty acid or equivalent reagents to a sufficient degree to render them substantially water-repellent, which results in a product that may be conveniently stored or shipped without appreciable caking.

As there does not appear to be any recognized term that may be used to designate all the materials amenable to the present process, the expression "a material of the class characterized by sylvinite ore" will be used in the specification to designate the materials herein described and their equivalents, which may be treated by the present process.

It will be apparent that the saturated solution herein described may be varied in composition to a considerable degree without impairing the effectiveness of the treatment. Therefore where "saturated solution" is used in the description and claims it is intended to designate a solution saturated with respect to one composition and which may also contain a saturation or partial-saturation of another composition.

Where the term "alkali resinate" is used in the specification, it is intended to designate a reagent of the type described and claimed in my Patent No. 2,105,295 of January 11, 1938 for Flotation process.

In order to employ a generic expression to designate the various reagents shown to be effective for the present invention, as well as equivalents thereof not specifically described, the notation "a composition of the class characterized by oleic acid" salt water soaps, and alkali resinates has been selected.

Features described but not claimed herein have been claimed in my several co-pending applications hereinbefore referred to, and other copending applications, as follows:

The temperature control features of the present process are described and claimed in Patent No. 2,105,294;

The use of the class of reagents comprising oleic acid, coconut oil soap, palm kernel oil and alkali resinates for floating sodium chloride and gangue constituents of sylvinite ores has been described and claimed in my co-pending application, Serial No. 173,431, while the use of the alkali resinate reagents for the same purpose has been claimed specifically in Patent No. 2,105,295;

The use of cresylic acid compositions with the reagents described in the preceding paragraph is described and claimed in application, Serial No. 123,484;

The milling treatments in an operation in which potassium chloride is floated are described and claimed in application Serial No. 38,316; and The milling treatments in an operation in which sodium chloride and gangue are floated are described and claimed in application Serial No. 81,729, and also in my co-pending application, Serial No. 28,983.

Changes and modifications may be availed of within the spirit and scope of the invention as defined in the hereunto appended claims.

What I claim and desire to secure by Letters Patent is:

1. In a process for the purification of an ore containing mixed chlorides of sodium and potassium having insoluble gangue matter as an impurity thereof, the improvement which comprises introducing such a composition in finely-divided condition into a saturated solution of such composition to form a pulp, and purifying the composition by subjecting the pulp so formed to the action of an alkali resinate in a froth flotation treatment, whereby such gangue constituents are selectively collected in a froth separate from other solid constituents of the composition.

2. In a process for the purification of an ore containing mixed chlorides of sodium and potassium having insoluble gangue matter as an impurity thereof, the improvement which comprises introducing such a composition in finely-divided condition into a saturated solution of such composition to form a pulp, and purifying the composition by subjecting the pulp so formed to the frothing and collecting action of a composition containing an alkali resinate and cresylic acid in a froth flotation treatment, whereby such gangue constituents are selectively collected in a froth separate from other solid constituents of the composition.

3. In a process for the treatment of a sodium chloride composition containing gangue material and some potassium chloride as impurities thereof, the improvement which comprises introducing such a composition in finely-divided condition into a solution saturated with respect to sodium chloride to form a pulp, and purifying the composition by subjecting the pulp so formed to the frothing and collecting action of an alkali resinate, in a froth flotation treatment, whereby such potassium chloride impurities are dissolved and gangue constituents are selectively collected in a froth separate from the sodium chloride.

4. In a process for the treatment of a potassium chloride composition containing gangue material and some sodium chloride as impurities thereof, the improvement which comprises introducing such a composition in finely-divided condition into a solution saturated with respect to potassium chloride to form a pulp, and purifying the composition by subjecting the pulp so formed to the frothing and collecting action of an alkali resinate, in a froth flotation treatment, whereby such sodium chloride constituents are dissolved and gangue constituents are selectively collected in a froth separate from the potassium chloride.

5. In a process for the treatment of sylvinite ore containing insoluble gangue matter as an impurity thereof, the improvement which comprises introducing such sylvinite ore in finely-divided condition into a saturated solution of the ore to form a pulp, purifying the ore by subjecting the pulp so formed to the action of an alkali resinate, in a froth flotation treatment, whereby such gangue constituents are selectively collected in a froth separate from other constituents of the composition, and separating the residual solids of the initial flotation treatment in a second froth flotation treatment by the action of a reagent having a selective affinity for one of the constituents.

ARTHUR J. WEINIG.